United States Patent [19]

Schultz et al.

[11] 4,260,702

[45] Apr. 7, 1981

[54] POLYMERS CONTAINING CYCLIC ETHER UNITS JOINED THROUGH 2,6-DIYL LINKAGES

[75] Inventors: William J. Schultz; Samuel Smith, both of St. Paul, Minn.

[73] Assignee: Minnesota Mining and Manufacturing Company, St. Paul, Minn.

[21] Appl. No.: 97,138

[22] Filed: Nov. 26, 1979

[51] Int. Cl.³ .................. C08G 61/08; C08G 59/14
[52] U.S. Cl. ................... 525/334; 260/345.2; 260/345.9 R; 525/332; 525/387; 528/417
[58] Field of Search ............ 525/332, 334, 387; 528/417; 260/345.2, 345.9

[56] References Cited

U.S. PATENT DOCUMENTS

| | | | |
|---|---|---|---|
| 3,436,377 | 4/1969 | Dittmann et al. | 525/334 X |
| 3,884,893 | 5/1975 | Kolb | 525/387 X |
| 4,051,199 | 9/1977 | Udipi et al. | 525/332 X |

Primary Examiner—Earl A. Nielsen
Attorney, Agent, or Firm—Cruzan Alexander; Donald M. Sell; James V. Lilly

[57] ABSTRACT

Polymers that have a number average molecular weight of at least 1000 and that contains at least 5% by weight of segments that contain at least two consecutively recurring cyclic ether units wherein at least one of said tetrahydropyran 2,6-diyl unit of the formula

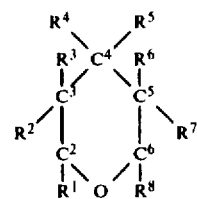

and wherein the remainder of said cyclic ether units are selected from said tetrahydropyran 2,6-diyl units and tetrahydrofuran 2,5-diyl units of the formula

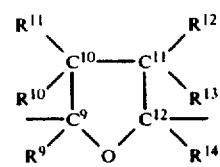

wherein
$R^1$, $R^8$, $R^9$, $R^{10}$, $R^{11}$, $R^{12}$, $R^{13}$ and $R^{14}$ are each selected from hydrogen and lower alkyl groups;
$R^2$ and $R^7$ are each selected from hydrogen, lower alkyl groups and aryl groups;
$R^4$ and $R^5$ are each selected from hydrogen, lower alkyl groups, aryl groups and halo; and
$R^3$ and $R^6$ are selected from hydrogen, lower alkyl groups and aryl groups or combine to form a divalent linking moiety having the formula

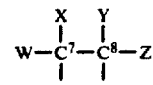

wherein $C^7$ and $C^8$ are joined to the $C^3$ and $C^5$ positions respectively of said cyclic ether units; W, X, Y and Z are each monovalent groups or W and Z are each monovalent groups and X and Y combine to form a divalent linking moiety, that bridges between $C^7$ and $C^8$.

18 Claims, No Drawings

POLYMERS CONTAINING CYCLIC ETHER UNITS JOINED THROUGH 2,6-DIYL LINKAGES

BACKGROUND OF THE INVENTION

This invention relates to a novel class of polymers. More particularly it relates to a class of polymers containing consecutively recurring tetrahydropyran 2,6-diyl units. The polymers of the invention are sometimes referred to herein as "diyl" polymers and the recurring units as 2,6-diyl units.

The polymers of the present invention represent a class of novel polymers that are useful as adhesion promoting agents in a variety of applications. Moreover, many of the novel polymers possess the remarkable ability to form stable complexes with organic and inorganic cations. As a result, these polymers are useful in phase transfer applications and as dispersing agents for inorganic particles in nonaqueous solvents. Additionally, many of the polymers of the invention possess an unusual reactivity that makes them especially valuable in the preparation of thermosetting coatings and adhesives.

SUMMARY OF THE INVENTION

In accordance with the present invention there is provided a polymer having a number average molecular weight of at least 1000 and containing at least 5% by weight of recurring cyclic ether units joined one to the other to provide segments of at least two of said units, at least one of said units being a tetrahydropyran 2,6-diyl unit having the formula

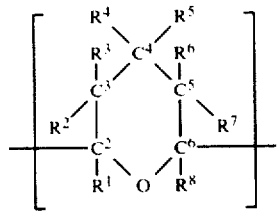

(I)

while the remainder of said cyclic ether units are selected from said tetrahydropyran 2,6-diyl units and tetrahydrofuran 2,5-diyl units, wherein said tetrahydrofuran 2,5-diyl units have the formula

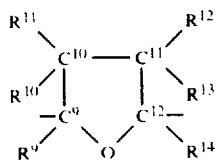

(II)

wherein $R^1$, $R^8$, $R^9$, $R^{10}$, $R^{11}$, $R^{12}$, $R^{13}$, and $R^{14}$ are each selected from hydrogen and lower alkyl groups;

$R^2$ and $R^7$ are each selected from hydrogen, lower alkyl groups and aryl groups;

$R^4$ and $R^5$ are each selected from hydrogen, lower alkyl groups, aryl groups and halo; and $R^3$ and $R^6$ are selected from hydrogen, lower alkyl groups and aryl groups, or combine to form a divalent linking moiety having the formula

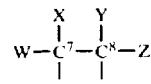

(III)

wherein $C^7$ and $C^8$ are joined to the $C^3$ and $C^5$ positions respectively of said cyclic ether units; W, X, Y and Z are each monovalent groups or X and Y combine to form a divalent linking moiety Q, that bridges between $C^7$ and $C^8$. In this latter instance, the type III units may be represented by

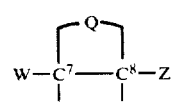

(IV)

In the above structural formulae, an arbitrary numbering system has been adopted for purposes of simplifying the generic description of the diyl-containing units. It should be recognized that conventional nomenclature would classify said units as tetrahydrofuran 2,5-diyl and tetrahydropyran 2,6-diyl corresponding respectively to the cyclic ether units containing 5 and 6 atoms in the ring respectively.

Preferably, the polymers of the invention contain at least six of said cyclic ether units joined together in the segment. Preferably at least 30% (and most preferably at least 50%) of the ring junctures between adjacent cyclic ether units are in the threo configuration.

A preferred subclass of the polymers of the invention contains segments of the formula

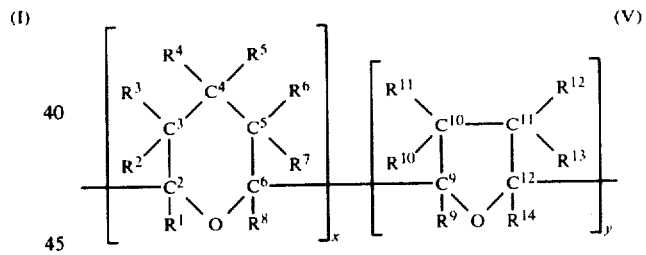

(V)

In formula V, $R^1$ through $R^8$ are as described above, $R^9$ through $R^{14}$ are selected from hydrogen and lower alkyl groups, and x and y are each at least 1. The tetrahydropyran 2,6-diyl and tetrahydrofuran 2,5-diyl units may either occur individually (i.e., the segment may contain alternating tetrahydropyran 2,6-diyl units and tetrahydrofuran 2,5-diyl units) or in uninterrupted blocks of each of the diyl units.

Another preferred subclass of the polymers of the invention includes the segments consisting essentially of tetrahydropyran 2,6-diyl units and wherein each of the R groups is selected from hydrogen and lower alkyl groups (i.e., groups containing up to 4 carbon atoms). A particularly preferred member of this subclass of polymers is that wherein at least four of the R groups are hydrogens. Most preferably each of the R groups is hydrogen.

Yet another preferred subclass of the polymers of the invention includes those wherein $R^3$ and $R^6$ combine to form the divalent linking moiety of Formula III. Preferably, in these polymers, each of the remaining R groups is selected from hydrogen and lower alkyl groups (i.e., up to 4 carbon atoms) and W, X, Y and Z are each hydrogen. Preferably at least four of the remaining R groups are hydrogens. Most preferably each of the remaining R groups is hydrogen.

DETAILED DESCRIPTION OF THE INVENTION

The polymers of the present invention may be prepared through a series of reactions that involve (a) the ring opening polymerization of an appropriate olefin using olefin metathesis catalysts to provide a polymer precursor, (b) subsequent epoxidation of the olefin groups of the resulting polymer precursor chain, and finally (c) ring expansion to form the diyl ring. Each of these reactions is described in more detail hereinafter.

In any event, the polymers of the present invention may be homopolymers of Formula I units, copolymers consisting essentially of Formula I and II units, or copolymers containing segments of Formula I and optionally Formula II units joined together with substantial amounts of other units. Thus, one of the "dangling" bonds of the Formula I units may be joined to another Formula I or II unit while the other "dangling" bond may be joined to another Formula I unit, a Formula II unit, another main chain polymer continuing unit, or a terminal unit of the polymer chain.

Polymer precursors useful in preparing the Formula V polymers of the invention contain units of the formula

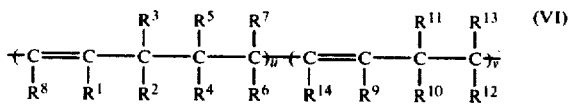

wherein $R^1$–$R^{14}$ are as described above and u and v are integers and the sum of u+v is at least one more than the sum of x+y. The ratio of u to v and the structural relationship of the tetrahydropyran 2,6-diyl units to the tetrahydrofuran 2,5-diyl units in the final polymer is governed by the ratio of u to v and the structural relationship of the pentene units to the butene units in the polymer precursor.

Thus, polymer precursors that are useful in preparing the polymers of the invention are those that contain at least three main chain olefin groups in a segmental array. These olefin groups contain either two or three intervening carbon atoms between them, provided that three carbon atoms occur between at least two of the olefin groups.

The preparation of polymer precursors and the subsequent reactions that lead to the formation of the tetrahydrofuran 2,5-diyl units is further described in copending application Ser. No. 803,207 filed June 3, 1977.

To the extent that the precursor polymer segments have fewer than two and more than three carbon atoms separating the main chain olefin groups defect structures are introduced into the precursor that interfere with the ability of the precursor to undergo the subsequent ring expansion reaction as is discussed more fully below. It is preferable, therefor, to limit the concentration of these defect structures.

The polymer precursors preferably used in preparing the polymers of the invention contain three or more units of the formula

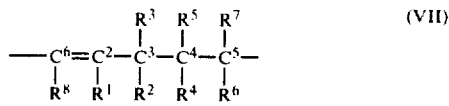

At least three of these units must be connected to each other in a head to tail fashion to provide a segment of the formula

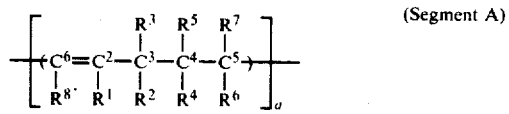

wherein the R groups are as defined above and a is at least 3 and corresponds to the number of times that each Formula VII unit occurs in the A segment. Polymer precursors of this type ultimately produce tetrahydropyran 2,6-diyl units.

Both the length of the uninterrupted array of consecutively joined cyclic ether units and the stereochemistry of the ring junctures between the adjacent cyclic ether units have a significant effect upon the cation complexing ability of the polymers of this invention. Thus, it has been found that polymers in which four, and preferably at least six, of said cyclic ether units recur in consecutive array and at least 30%, and preferably at least 50%, of said ring junctures are in the threo configuration are particularly useful as cation complexing agents. When, on the other hand, the ring junctures are predominately in the alternate configuration (i.e. the erythro configuration) the polymers are not effective cation complexers. Such polymers do, however, find utility in other areas such as dispersing agents and as adhesion promoting agents on various substrates, particularly those that contain active hydrogen atoms capable of forming hydrogen bonds with the polymers of this invention.

The manner in which the ring juncture configuration affects the ability of polymers containing recurring cyclic ether units joined together in consecutive array is discussed more fully in copending application Ser. No. 97,486, filed on even date herewith.

As used herein, the term "threo configuration" means that the R groups attached to the $C^2$ and $C^6$ atoms (the ring juncture carbons) are fixed into a particular stereochemistry. This stereochemistry may be illustrated by a Newman projection along the ring juncture bond:

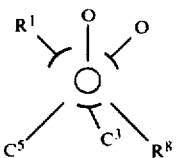

In this projection, the inner or smaller circle represents the $C^6$ atom of Formula I while the outer or larger circle represents the $C^2$ atom of Formula I. Thus, in a threo ring juncture configuration, rotation about the ring juncture bond produces only those eclipsed arrangements for which fewer than two identical or similar groups are adjacent to one another. ("Basic Principles of Organic Chemistry", J. D. Roberts and M. C. Caserio, W. A. Benjamin, Inc. (1964) p. 580.).

A polymer segment that has all threo ring junctures then is graphically illustrated by

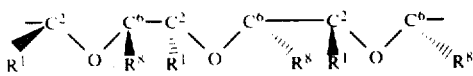

wherein the $C^3$ through $C^5$ positions have been omitted for purposes of simplicity; and wherein the bond represented by ▲ means a bond projecting out of the plane of the paper; and wherein the bond represented by ⋮ means a bond projecting into the plane of the paper. As can be seen, then, the same or similar substitutents on adjacent ring juncture carbon atoms project in opposite directions when all of the oxygen atoms are aligned on the same side of the polymer chain.

The erythro configuration, on the other hand, may be represented by the following Newman projection:

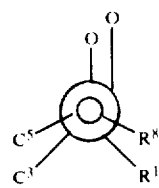

A polymer segment that has all erythro ring junctures then is graphically illustrated by

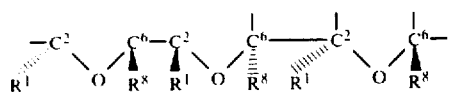

Thus in the erythro configuration, the same or similar substituents on adjacent ring juncture carbon atoms project in similar directions when all of the oxygen atoms are aligned on the same side of the polymer chain.

The stereochemistry of the ring junctures can be controlled by appropriate selection of the polymer precursor. Thus, threo configurations result to the extent that the polymer precursor contains cis-olefinic main chain units, while erythro configurations result to the extent that the polymer precursor contains trans-olefinic main chain units when a nucleophilic initiator is employed in the ring expansion reaction. Threo and erythro ring juncture configurations occur in the final polymer in the same proportion as the cis- and trans-olefinic groups occur in the polymer precursor.

In any event, suitable precursor polymers for use in preparing the tetrahydropyran 2,6-diyl units of the polymers of the invention may be obtained by the ring opening polymerization of cycloalkenes with so called olefin metathesis catalysts. Olefin metathesis polymerizations are described in N. Calderon, J. Macromol, Sci. Revs. Macromol. Chem. C7(#1), pp. 105-159. A number of cycloalkenes are known to polymerize when influenced by an olefin metathesis catalyst if they contain ring strain.

The catalyst generally used for olefin metathsis reactions are molybdenum, tungsten, rhodium and iridium compounds. In many cases catalysts such as alkyl aluminum compounds, are used in conjunction with the transition metal catalyst.

Olefin metathasis catalysts induce polymerization of cycloalkenes by a ring opening mechanism. The resulting polymer is linear and contains recurring main chain olefin groups. The number of carbon atoms separating the main chain olefin groups in the backbone structure of the precursor polymers used in this invention is normally three, as shown in Formula VII or a mixture of two and three carbon atoms as shown in Formula VI. Thus examples of monomers used to provide such precursor polymers are cyclopentene, substituted cyclopentenes, norbornene and substituted norbornenes. A monomer such as 1,6-cyclodecadiene would also provide a Formula VII precursor polymer.

By way of example, if cyclopenetene is used to provide the polymer precursor, a polypentenamer, referred to herein as polycyclopentene, is obtained that contains units of Formula VII in which all of the R groups are hydrogen. If, however, 3-methyl cyclopentene is used either in whole or in part to provide the polymer precursor, then that precursor contains units of Formula VII wherein either the $R^2$ or the $R^7$ group is methyl in the same proportion that the original monomer mixture was constituted of 3-methyl cyclopentene.

Monomers preferred for providing suitable polymer precursors include cyclopentene, substituted cyclopentene, norbornene and substituted norbornenes. These monomers can be homopolymerized, or copolymerized (especially with each other) with other olefinic monomers.

Useful cyclopenetene monomers include cyclopentene, 2-methyl cyclopentene, 3-butyl cyclopentene, 4-chlorocylopentene, 4-ethyl cyclopentene, 3-phenyl cyclopentene and 3,5-dimethyl cyclopentene. Thus, in Formula VII units contained in precursor polymers derived from cyclopentenes, the $R^1$ and $R^8$ groups are selected from hydrogen and lower alkyl; the $R^2$, $R^3$, $R^6$ and $R^7$ groups are selected from hydrogen, lower alkyl and aryl; and $R^4$ and $R^5$ are groups selected from hydrogen, lower alkyl, aryl and halo.

A large variety of suitable monomers can also be provided by norbornene (i.e., bicyclo[2.2.1]-2-heptene or norbornylene) and its related compounds. Norbornene is prepared by the Diels-Alder addition of a dienophile, e.g., ethylene, to cyclopentadiene. Substituted norbornenes can be obtained by using either substituted cyclopentadienes or substituted olefins as the dienophiles as shown in Norton, J. A.: Chem. Rev. 31, pages 319-523, 1942.

Examples of useful substituted cyclopentadienes include 1-ethyl cyclopentadiene, 1-methyl cyclopentadiene, 2,3-dimethyl cyclopentadiene, 2-ethyl-4-butyl cyclopentadiene, 5-naphthyl cyclopentadiene and 5,5-dichloro cyclopentadiene.

When ethylene is used as the dienophile in the Diels-Alder addition to the above cyclopentadienes, polymerization of the resulting adducts by olefin metathesis provides polymer precursors that contain Formula VII units in which $R_1$ and $R^8$ are selected from hydrogen and lower alkyl groups, $R^2$ and $R^7$ are selected from hydrogen, lower alkyl groups and aryl groups, $R^4$ and $R^5$ are selected from hydrogen, lower alkyl groups, aryl groups and halo groups, and $R^3$ and $R^6$ combine to form an ethylene (i.e., $-CH_2CH_2-$) bridge linking the $C^3$ and $C^5$ carbon atoms.

Alternatively, a large variety of substituted norbornenes can be prepared by utilizing substituted olefins in place of ethylene as the dieneophile. These olefins may be represented by the formula $$\begin{array}{cc} X & Y \\ | & | \\ C=C \\ | & | \\ W & Z \end{array} \qquad \text{(VIII)}$$

wherein W, X, Y and Z are groups that do not interfere with the subsequent sequence of the olefin metathesis polymerization, epoxidation and ring expansion reactions. Normally, W, X, Y and Z are monovalent substituents that are selected from hydrogen, alkyl, cycloaliphatic, aryl, halo, ester, alkylene, carboxyl, carboxylester, nitro and nitrile, or X and Y combine to form a divalent linking group Q that joins the two carbon atoms. The Q group may be ethylene (from using cyclobutene as the dienophile), trimethylene (from cyclopentene), carboxylic anhydride, i.e., $$\begin{array}{c} -C-O-C- \\ \| \quad \quad \| \\ O \quad \quad O \end{array}$$

(from maleic anhydride), dimethylylene oxide, i.e., $-CH_2-O-CH_2-$ imide, i.e., $$\begin{array}{c} -C-NH-C- \\ \| \quad \quad \quad \| \\ O \quad \quad \quad O \end{array}$$

(from maleimide), dimethylene sulfone, i.e., $-CH_2SO_2CH_2-$ (from 2,5-dihydrothiophene dioxide), indenyl, i.e.,

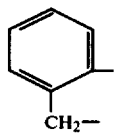

(from indene), etc.

Common olefinic dieneophiles include ethylene, cyclobutene, cyclopentene, 1-butene, styrene, indene, acrylonitrile, 1,1-dicyanoethylene, tetracyanoethylene, crotonitrile, vinyl chloride, vinylidene chloride, 1,2-dichloroethylene, trichloroethylene, nitroethylene, 1-nitro-1-propene, 2,5-dihydrofuran, 2,5-dihydrothiophene dioxide, vinyl acetate, vinyl formate, allyl chloride, allyl bromide, crotyl alcohol, methyl acrylate, acrylic acid, methylmethacrylate, butyl methacrylate, acrolein and maleic anhydride and maleimide.

The choice of specific cyclopentene or norbornene monomers may influence conditions selected for providing the polymer precursors utilized in this invention. The polymerization of various functionally substituted norbornene compounds by olefin metathesis to provide materials having units corresponding to type III is discussed in S. Matsumoto et al, American Chem. Soc. Symposium Series No. 59, Ring-Opening Polymerization International Symposium, p. 303-317, 1977.

Again, wide latitude in the selection of R group substituents is afforded without serious interference with the olefin epoxidation reaction which is utilized in preparing the polymers of this invention. A description of olefin epoxidation reactions is provided in D. Swern, Organic Peroxides Vol. II, Chapter V, p. 355-533, 1971, John Wiley, New York.

Certain of the Q groups exemplified above may undergo chemical transformation during the course of the epoxidation or ring expansion reactions thereby asserting some effect on these reactions. Thus, where Q is a carboxylic anhydride divalent linkage, it may cleave to form permaleic acid, maleic acid or maleate salt groups during the course of these reactions. In any event, conditions may be selected which allow successful conduct of these reactions to provide the desired products. For example, if maleic acid groups were present, they would preferably be neutralized, e.g., with sodium hydroxide, if a nucleophilic catalyst was employed in the final ring expansion reaction.

A given cycloalkene may be copolymerized with another cycloalkene using olefin methathesis catalysts to provide a suitable precursor polymer. For example, if cyclopentene is copolymerized with norbornene, a copolymer is obtained having a backbone of the formula

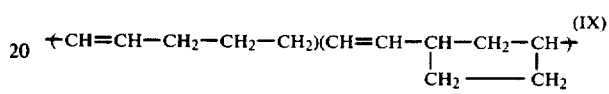

Similarly, valuable precursor polymers may be provided by the olefin metathesis reaction of a mixture of either a cyclopentene or norbornene with a cyclic olefin such as a cyclobutene or a 1,5-cyclooctadiene. Such precursors would give rise to final products in which tetrahydrofuran 2,5-diyl and tetrahydropyran 2,6-diyl units were interspersed within one or more of the desired segmental arrays.

Suitable precursor polymers may also be obtained by copolymerizing a suitable monomer, such as cyclopentene or norbornene, with low concentrations of a monomer such as cyclooctene to provide a polymer having a multiplicity of A segments. These segments tend to be relatively short and are interspersed with, in this instance, six main chain carbon atoms between the main chain olefin groups.

Precursor polymers may also be provided in other ways. It is well known that polymers containing olefin groups are suitable substrates for preparing graft polymers. For example, polycyclopentene derived from cyclopentene would provide a suitable substrate for free radical and anionic grafting reactions where acrylic or vinyl monomers could be grafted off the polycyclopentene backbone. A discussion of these techniques can be found in *Block and Graft Copolymerizations* Vol. 1, Ed. by R. T. Ciresa, John Wiley and Sons, New York (1973). These graft copolymers are suitable precursor polymers in preparing the polymers of the present invention.

The molecular weight of the precursor polymer generally controls the final molecular weight of the polymers of the invention. Precursor polymers derived from olefin methathesis reactions tend to have high molecular weights, e.g., greater than 500,000. The molecular weight of these precursor polymers can frequently be controlled by polymerizing cyclic olefins in the presence of small quantities of linear olefins such as butene which act as termination agents. The concentration of the linear olefin will control the molecular weight.

Another method of controlling the molecular weight of the precursor polymers is to cleave high molecular weight polymers. Ozone is a convenient reagent to cleave precursor polymers. It reacts quantitatively with olefin groups in the polymer backbone and forms an ozonide. The ozonide can then be reacted with a variety of reagents, e.g., LiAlH₄, resulting in cleavage of the polymer chain. By controlling the ratio of ozone to monomer units in the polymer, the molecular weight can be effectively controlled.

The polymers have theoretical number average molecular weights of at least 1000. The number average molecular weight may, however, be substantially higher (e.g., 2,000,000 or more). Homopolymers of Formula I units generally have a calculated number average degree of polymerization of about 12-25,000 with respect to all recurring units).

The copolymers may be block or graft copolymers that contain segments of the Formula I units. The segments of Formula I units preferably appear therein in the main polymer backbones. Both the homopolymers and the copolymers normally contain small amounts of defect structures due to the nature of the process for their preparation. Such defect structures include the addition products of fragments of materials used as ring expansion initiators, solvent fragments, etc.

Epoxidation of the polymer precursor is normally performed so as to convert substantially all main chain olefin groups into oxirane groups. When such conversion is quantitative, all Formula VII units are converted to

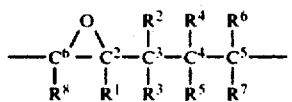
(X)

The Formula IX units are joined to each other in head-to-tail fashion to provide segments of the formula

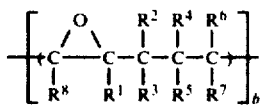
(Segment B)

wherein b is at least three and equals the number of times that each Formula X unit recurs in a B segment. The segment length b of the B segments is preferably the same as the segment length a of the A segments.

Epoxidization is generally carried out by the reaction of the precursor polymer with a peracid (e.g., peracetic acid). Typically, the reaction is carried out at about 30° C. and at atmospheric pressure using a slight excess of the peracid. After the reaction has been completed, the polymer is recovered from the reaction mixture by, for example, precipitation. The precipitate is then typically purified and dried.

After epoxidation, the precursor is subjected to a ring expansion reaction to provide the polymers of the invention. In this step, an appreciable fraction of the oxirane groups in the B segments is converted to Formula I units. It is a particularly significant aspect of the invention that polymers containing B segments having the requisite structural features discussed previously can be made to undergo an intramolecular (more specifically, an intra-segmental) chain reaction in which a large fraction of the oxirane groups within the B segments are converted to ring-expanded, recurring tetrahydropyran-2,6-diyl units. The hypothesized course of the reaction is as follows:

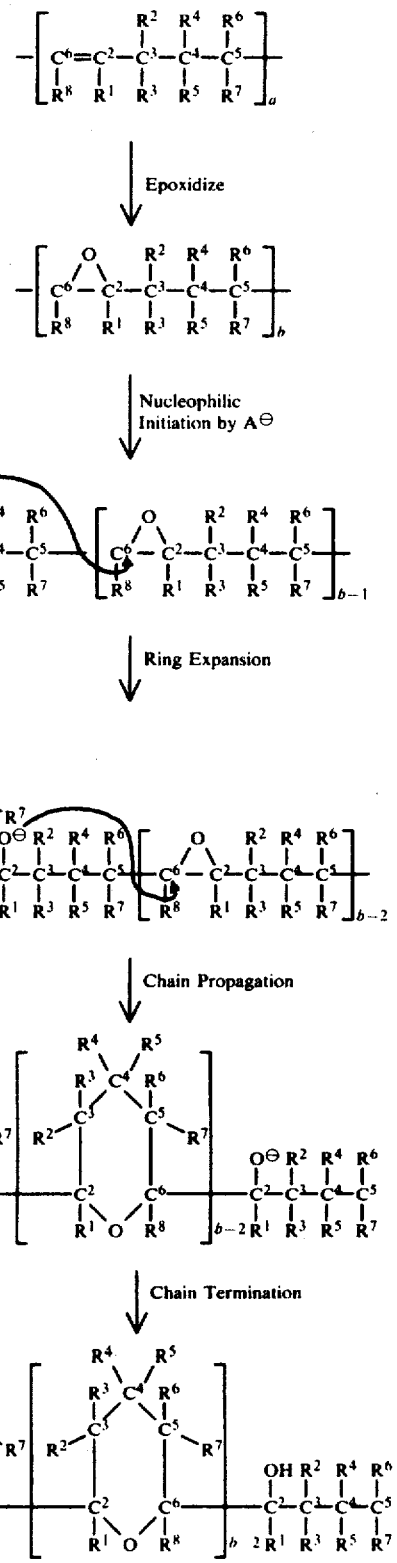

It appears that the initiation step proceeds via the cleavage of a randomly situated oxirane ring located within a B segment to generate a reactive ionic intermediate. This intermediate then reacts with an adjacent oxirane ring to start an intramolecular chain propagation reaction in which an uninterrupted sequence of adjacent oxirane groups is converted to tetrahydropyran 2,6-diyl groups joined one to the other. This chain propagation (or ring expansion) reaction may proceed within a single B segment of the polymer molecular until a terminus group of that segment is encountered (most commonly in the form of a defect structure) and chain termination occurs.

Chain termination may occur in another fashion. If reactive protic impurities or solvents are present, these molecules may react with the reactive ionic intermediate generated in the initiation or subsequent propagation steps and introduce additional functional groups that serve as termini of the segments of Formula I units. Therefore, it is normally preferred that the solvents used to conduct the base catalyzed ring expansion reaction be relatively free of water or primary alcohols.

It has been observed that the ring expansion reaction proceeds well in highly polar organic solvents such as tetrahydrothiophene-1,1-dioxide, hexamethyl phosphoramide and dimethyl sulfoxide, although with a certain amount of polymer cleavage. Highly preferred solvents for the base catalyzed ring expansion are secondary and tertiary alcohols which allow clean conversion of oxirane groups to tetrahydropyran 2,6-diyl units with essentially no chain transfer or polymer cleavage. In certain cases mixed solvents may be used to dissolve a given epoxidized polymer precursor and serve as the reaction medium during ring expansion.

Because of the nature of the reaction, and if protic chain terminators are not present, it follows that:

1. The requisite structural features set forth for polymers containing B segments must be met in order to support the formation of polytetrahydropyran 2,6-diyl units in the necessary numbers and arrays (i.e. segments containing consecutive diyl groups).

2. The longer a particular B segment, the more likely it is to undergo the ring expansion reaction. Even at relatively low ring expansion conversions (e.g., 20 percent), relatively long segments of recurring polytetrahydropyran 2,6-diyl units can be produced in such instances retaining a high proportion of the original B segments intact.

3. The median segment length of recurring polytetrahydropyran 2,6-diyl groups is a function both of the weight median length of the B segment from which they were derived and the overall degree of conversion of oxirane groups at the point at which the ring expansion reaction is terminated.

4. The median length of the segments produced toward the end of the ring expansion reaction is smaller than that of the segments produced near the beginning thereof due to the continued introduction of new defect structures during the reaction.

5. Polymers in which the epoxidized B segments constitute at least 97 percent of the weight of the total polymer chain can be made to yield ring expanded products in which polytetrahydropyran 2,6-diyl units recur in extremely long segments, e.g. weight average segment lengths of 100 or more.

The ring expansion reaction is carried out in the presence of an initiator selected from reagents which are known to initiate homopolymerization of oxiranes by a ring opening mechanism, but which preferably do not undergo addition reactions with oxirane groups. Preferred initiators are strong nucleophiles such as alkali metal alkoxides or hydroxides and tetraalkyl ammonium alkoxides or hydroxides.

Normally when a nucleophilic catalyst is utilized, the ring expansion reaction is carried out in a solvent such as a secondary butyl alcohol/dioxane blend at temperatures from 50° C. to 150° C. and employs 1-25 mole % catalyst based on oxirane content. It may take from five minutes to several days to complete. The severity of the conditions (i.e., time and temperature) are directly relatable to the activity of the catalyst. The reaction may be terminated at any time prior to complete conversion of the oxirane units to tetrahydropyran 2,6-diyl units.

The resultant polymer may then be recovered by precipitation from the reaction solvent by adding water thereto. It may be further purified by redissolving and reprecipitating.

When an appreciable residue of highly reactive oxirane groups are left intact, they may be subsequently utilized for other purposes. Thus, for example, such materials can be later cured with or without additional epoxy resins using conventional curatives to give highly crosslinked compositions that have utility as tough protective coatings and bonding adhesives. Similarly, they may be ring opened with various reactants containing active hydrogen atoms to introduce such groups as amino, hydroxy, carboxyl and acrylate groups, thereby imparting either desirable solubility or reactivity characteristics.

The ring expansion reaction may also be carried out in the presence of an electrophilic reagent. Generally the reagent is present in an amount of from about 0.1 to 10 mole% based on the oxirane content of the polymer precursor. Preferably the solvent is a protic solvent such as water or methanol. If an aprotic solvent is utilized the polymer tends to gel.

When using electrophilic reagents in the presence of protic solvents, the resulting polymer tends to have shorter segments of type I units than one made using nucleophilic reagents as catalysts. This is due to the higher rate of chain termination relative to chain propogation. Chain termination in this case generally appends high concentrations of structures in the form of hydroxyl groups.

Representative examples of useful electrophilic catalysts are p-toluenesulfonic acid, $SnCl_4$, $BF_3$ and $(CF_3SO_2)_2CH_2$.

The structure of the tetrahydropyran 2,6-diyl containing polymers of the invention can be demonstrated by proton nuclear magnetic resonance (nmr). For example, the analysis of a polytetrahydropyran 2,6-diyl derived from cis-polycyclopentene was run in deuterochloroform as the solvent and all chemical shifts (i.e. absorption peaks) were reported in parts per million (ppm) from tetramethylsilane. The peak assignments were as follows:

A. The epoxide precurser

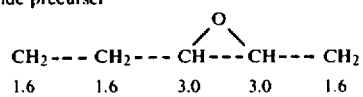

B. The tetrahydropyran 2,6-diyl product

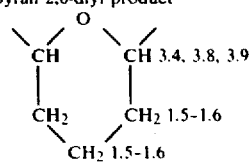

The methine protons show multiple absorptions because of the different stereochemical configurations present.

The following examples are offered in order to further illustrate the present invention.

EXAMPLE 1

A polymer of the invention was prepared from cis-polycyclopentene that had been prepared according to the procedure described in Die Angewandte Makromolekulare Chemie, 16/17, p 51–74 (1971). The polymer was then epoxidized using the following two solutions.

| Solution A | |
|---|---|
| cis-polycyclopentene (number average molecular weight approx. 120,000) | 21 grams |
| chloroform | 850 grams |
| Solution B | |
| peracetic acid solution* | 65 grams |
| sodium acetate (buffering agent) | 24 grams |

*40% peracetic acid, 40% acetic acid, 13% water, 5% hydrogen peroxide and 2% sulfuric acid Solution A was placed in a 3 neck flask, and was cooled to 5° C. with an ice bath. Solution B was placed in a dropping funnel on the flask and was added to Solution A with stirring over a 30 minute period. The reaction mixture was cooled intermittently so as to maintain the reaction temperature between 20° C. and 25° C. After addition of Solution B, the reaction was allowed to proceed at 25° C. for 2½ hours.

The resultant epoxidized polycyclopentene (EPCP) chloroform solution was purified by first adding 1 liter of water and stirring vigorously for 30 minutes. The water was decanted and replaced by 1 liter of a 2% sodium carbonate solution in water. This was then stirred for 16 hours after which the solution was decanted. The polymer was recovered by precipitation into methyl alcohol. The yield was 25.4 g. Proton nmr showed the product to consist essentially of fully epoxidized polycyclopentene.

A 2.8% by weight solution of EPCP was prepared by dissolving 28 g of EPCP in 722 g of purified dioxane (e.g., dioxane freshly distilled from calcium hydride). Secondary butyl alcohol (250 g) was slowly added to the solution with gentle agitation. (The secondary butyl alcohol precipitated the polymer if added too rapidly.) The solution of EPCP was then checked by vapor phase chromatography to ensure that no trace amounts of chloroform remained.

Ring Expansion Step

The EPCP was ring expanded under various conditions (e.g., reaction times, temperatures, and catalyst concentrations). The catalyst used was a 0.6 N solution of potassium tert-butoxide in tert-butanol. The reaction conditions are set forth in Table 1.

TABLE 1

| Sample | EPCP Sol'n (g) | Solid EPCP (g) | Moles EPCP | Catalyst Sol'n (ml) | Moles Catalyst | Reaction Temp (°C.) | Reaction Time (hrs) |
|---|---|---|---|---|---|---|---|
| A | 17.5 | 0.5 | 0.006 | .5 | 0.0003 | 110 | 16 |
| B | 17.5 | 0.5 | 0.006 | 1.0 | 0.0006 | 110 | 16 |
| C | 17.5 | 0.5 | 0.006 | 2.0 | 0.0012 | 110 | 16 |
| D | 17.5 | 0.5 | 0.006 | 0.5 | 0.0003 | 78 | 16 |
| E | 17.5 | 0.5 | 0.006 | 1.0 | .0006 | 78 | 16 |
| F | 17.5 | 0.5 | 0.006 | 2.0 | 0.0012 | 78 | 16 |
| G | 17.5 | 0.5 | 0.006 | 2.0 | 0.0012 | 87 | 16 |
| H | 17.5 | 0.5 | 0.006 | 2.0 | 0.0012 | 87 | 24 |
| I | 17.5 | 0.5 | 0.006 | 2.0 | 0.0012 | 87 | 40 |
| J | 17.5 | 0.5 | 0.006 | 2.0 | 0.0012 | 87 | 56 |

The reactions were all run in a sealed vial under a nitrogen atmosphere. Upon completion of the reaction, the polymer was purified by first precipitating it into 100 ml distilled water and then washing it with an additional 500 ml of distilled water. The mole percentages of the cyclic ether units of Formula I and the unreacted oxirane groups of Formula VII were determined by proton nmr in deuterochloroform. The results are set forth in Table 2.

TABLE 2

| Sample | Diyl Units (Mole %) | Oxirane Units (Mole %) |
|---|---|---|
| A | 83 | 17 |
| B | 90 | 10 |
| C | 97 | 3 |
| D | 20 | 80 |
| E | 27 | 73 |
| F | 33 | 67 |
| G | 47 | 53 |
| H | 78 | 22 |
| I | 95 | 5 |
| J | 100 | 0 |

Many of the products contained substantial concentrations of both tetrahydropyran 2,6-diyl and oxirane units. These units were segregated in relatively long segmental arrays. These segmented polymers were relatively tough, water resistant elastomers, soluble in tetrahydrofuran, dioxane, aromatic, alcohol, and chlorinated solvents. Polymers rich in tetrahydropyran 2,6-diyl units (83% or more) were relatively hard materials that softened at about 60° C. and had comparable solubilities.

Proton nmr analysis was unable to detect any extraneous functional groups in these polymers and there was no evidence of any polymer degradation as a result of these reactions. Thus, these polymers had number average molecular weights of about 150,000 (corresponding to a degree of polymerization of about 1800).

EXAMPLE 2

A polymer of the invention was prepared via electrophilic (e.g., acid catalyzed) ring expansion. Five grams of epoxidized cis-polycyclopentene (prepared and purified according to the procedures described in Example 1) was dissolved in 95 g of dioxane. Ten grams of methanol was added slowly with vigorous stirring. An acid catalyst (0.5 g of $(CF_3SO_2)_2CH_2$) was added to the polymer solution and the solution reacted, with stirring, for 16 hours at 25° C. The polymer was recovered by precipitation into two liters of deionized water and then washed with an additional two liters of deionized water. The polymer was found by N.M.R. to contain 65 mole % diyl units of Formula I, 20 mole % oxirane units of Formula X and the equivalent of about 15 mole % of pendent methoxy and hydroxy units.

EXAMPLE 3

A polymer of the invention was prepared from poly-cis-norbornene (PNB) that had the structure:

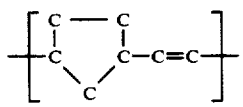

(The pendant hydrogen atoms have been omitted for purposes of simplicity.) The cis/trans ratio was 94/6. The PNB was prepared as described in Ivin, Laverty and Rooney, Macromol. Chem. Vol. 178, p. 1545-60, 1977.

The PNB was epoxidized and purified according to the procedures described in Example 1 from the following two solutions:

| Solution A | |
|---|---|
| PNB | 30 grams |
| chloroform | 970 grams |
| Solution B | |
| Peracetic Acid solution* | 66 grams |
| Sodium Acetate (buffering agent) | 2.0 grams |

*40% peracetic acid, 40 acetic acid, 13% water, 5% hydrogen peroxide and 2% sulfuric acid.

Thirty-four grams of epoxidized polynorbornene (EPNB) of about 50,000 number average molecular weight and having the structure

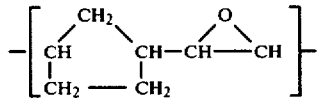

was recovered.

Ten grams of the EPNB as dissolved in 190 g of dioxane. After dissolution, 20 g of methanol was slowly added to the solution while it was being vigorously stirred. One gram of acid catalyst $(CF_3SO_2)_2CH_2$ was added and the solution was allowed to react for 16 hours at 25° C.

The ring expanded polymer was recovered and purified by precipitation into 2 liters of methanol. The resulting polymer was then washed with an additional 2 liters of fresh methanol.

The recovered polymer was analyzed by proton nmr The analysis indicated the polymer consisted of 60% of a cyclic ether having the structure

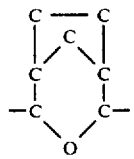

and 20% of unreacted oxirane groups. The remaining 20 mole % were units believed to have pendent hydroxy and methoxy groups. The final product was a hard plastic that softened at 140° C. It was soluble in toluene, tetrahydrofuran and chloroform.

EXAMPLE 4

2.85 g of EPNB prepared as described in Example 3 was dissolved in 98 g of cyclohexanol. The dissolved EPNB was ring expanded using a 0.6 N solution of potassium tert butoxide in tert butanol as catalyst. Table 3 lists the conditions used:

TABLE 3

| Sample | EPNB Sol'n (g) | Solid EPNB (g) | Moles EPNB | Catalyst Sol'n (ml) | Moles Cat. Sol. | Reaction Temp. (°C.) | Reaction Time (hrs) |
|---|---|---|---|---|---|---|---|
| A | 23.0 | 0.66 | 0.006 | 2.0 | 0.0012 | 80 | 16 |
| B | 23.0 | 0.66 | 0.006 | 2.0 | 0.0012 | 135 | 16 |
| C | 23.0 | 0.66 | 0.006 | 2.0 | 0.0012 | 135 | 16 |
| D | 23.0 | 0.66 | 0.006 | 2.0 | 0.0036 | 135 | 64 |

The polymerizations were carried out in a sealed vial under an inert atmosphere. The polymers were recovered by precipitation into 500 ml of a 75/25 mixture of water and methanol. The polymers were then washed with an additional liter of the water/methanol mixture. The polymer was then analyzed by proton nmr. The results are set forth in Table 4.

TABLE 4

| Sample Number | Diyl Units (mole %) | Oxirane Units (mole %) |
|---|---|---|
| A | 0 | 100 |
| B | 40 | 60 |
| C | 70 | 30 |
| D | 100 | 0 |

Proton nmr was unable to detect any additional functional groups within these polymers. Additionally, the ring junctures between adjacent diyl units in Polymer 4C (70 mole % diyl units and 30 mole % oxirane units) comprised 94% threo junctures and 6% erythro junctures. The majority of the segments of diyl units in Polymer 4C contained at least 6 consecutive diyl units.

EXAMPLE 5

A polymer of the invention that predominantly contained erythro ring junctures between adjacent diyl units was prepared from high polycyclopentene that had a high trans-olefin content.

Polycyclopentene that had an olefin microstructure of 80% trans and 20% cis was prepared. Two solutions were used in the preparation. They were Solution A A 0.05 molar solution in toluene with respect to both tungsten hexachloride and anhydrous ethanol.

Solution B

A 0.2 molar solution of $C_2H_5AlCl_2$ in heptane.

Toluene (160 g) and cyclopentene (40 g), which had previously been purified by distillation from NaH, were charged to a dried glass bottle fitted with a rubber septum. Solutions A and B were charged into the bottle with a syringe through the rubber septum. The bottle was then gently agitated on shaker for 4 hours at 22° C. The resulting polymer was recovered by precipitation into methanol. Twenty-two grams of polymer was recovered.

This polymer was dissolved in methylene chloride and epoxidized with peracetic acid by the procedure used in Example 1.

The epoxidized polycyclopentene was then ring expanded by the following procedure. Five grams of the fully epoxidized polycyclopentene were dissolved in 200 grams of dioxane and 40 grams of tert-butanol. 30 ml of a 1 molar solution of potassium tert butoxide was added to the epoxidized polycyclopentene solution. The solution was heated, in a 3 neck stirred flask, at 85° C. for 120 hours. The product was recovered by precipitation into two liters of distilled water. Proton nmr analysis of the product indicated that it was 75% 2,6-diyl and 25% oxirane.

EXAMPLE 6

This example demonstrates the ability of many polymers of the invention to complex potassium cations and act to effect the phase transfer of cations from dilute aqueous solutions into organic solvents.

A standard 0.006 M solution of potassium picrate was preprepared in water. A 0.102 M solution of the polymer prepared according to Example 1H was prepared in chloroform. (The molarity was based on the cyclic ether units present in the polymer.) Five ml of the potassium picrate solution were mixed with 5 ml of the polymer solution in a centrifuge tube. The mixture was agitated on a shaker for 24 hours and then centrifuged until the chloroform and water phases had completely separated. The UV absorbance at 353 nanometers of both the standard potassium picrate solution and the aqueous phase of the polymer/picrate mixture were then determined. Forty-three percent of the potassium picrate was transferred from the water phase into the chloroform phase by means of the polymers of the invention which meet the requisites of both segment structure and diyl ring structure configuration, as more fully discussed in copending application as Ser. No. 97,486, filed on even date herewith.

EXAMPLE 7

The polymer of Example 4C was used to effect the phase transfer of potassium picrate from a dilute aqueous phase.

A polymer solution that contained 0.25 g of the polymer of Example 4C in one liter of chloroform was prepared. A salt solution that comprised 0.025 g of potassium picrate in one liter of deionized water was prepared. The ml of the salt solution was mixed with 20 ml of the polymer solution. The mixture was agitated for 16 hours then allowed to stand for 48 hours. The concentration of the salt in the aqueous phase was measured both before and after addition of the polymer solution. The ultraviolet absorption of the aqueous phase at 353 nm was used for this determination. The difference in the two values measured the amount of salt transferred into the chloroform phase. It was found that 9 percent of the salt was transferred from the aqueous phase to the chloroform phase. This demonstrates that this polymer functions as a phase transfer agent.

EXAMPLE 8

This example demonstrates the ability of certain polymers of the invention to function as dispersing agents and viscosity modifying agents for inorganic particulates in non-aqueous solvents.

Two dispersions of strontium chromate in methyl ethyl ketone were prepared by ball milling the ingredients for 24 hours. The first dispersion comprised 2 g of strontium chromate and 100 g of methyl ethyl ketone. The second dispersion comprised 2 g of strontium chromate, 100 g of methyl ethyl ketone and 0.04 g of the polymer prepared according to Example 1H. The dispersions were placed in graduated containers and their settling times measured. The first dispersion settled within 3 minutes yielding approximately 98% clear supernatant. On the other hand, the second dispersion required 24 hours before it had settled and yielded approximately 98% clear supernatant.

EXAMPLE 9 Polymer prepared according to Example 1H was used as a viscosity modification agent for zinc oxide particles dispersed in toluene. Twenty grams of Photox ® 80 zinc oxide (New Jersey Zinc Company) was mixed with 20 g of toluene and agitated on a paint shaker for five minutes. The resulting mixture formed a solid cake. When another sample was prepared that contained 0.5 g of the polymer prepared according to Example 1H, 20 g of the zinc oxide and 20 g of toluene, a stable, fluid dispersion of zinc oxide in toluene was achieved. This demonstrates that polymers of the invention can be used to increase the stability of inorganic particulate dispersions and to reduce the viscosity of such dispersions.

EXAMPLE 10

Separate dispersions were prepared that contained 3 g of zinc oxide powder (Photox 80 ® from New Jersey Zinc Company), 27 g toluene and 0.09 of test polymer. After ball milling these mixtures for 16 hours, aliquots of each were poured into 5 ml graduate cylinders. These samples were examined after 7 minutes and then again after 6 hours of standing to determine the degree of settling of the zinc oxide. The volume of clear supernatant liquid that appeared after 6 hours was recorded. A control dispersion containing no test polymer was also prepared and tested for the degree of settling of the zinc oxide. The results are set forth below.

| SAMPLE | VOLUME CLEAR SUPERNATANT @ 6 HOURS (ml) |
|---|---|
| Control | Completely settled after seven minutes |
| Polymer Ex. 1H | 0.2 |
| Polymer Ex. 4C | 0.2 |

EXAMPLE 11

This example demonstrates the ability of certain polymers of the invention to act as primers for organic coatings on metals. Panels of cold rolled steel (15 cm × 10 cm × 0.3 cm) were degreased with methyl ethyl ketone, lightly abraded with 600 grit sandpaper and rinsed with methyl ethyl ketone. The panels were primed in the following manner:

A. A 1.5 micrometer (dry thickness) layer of the polymer prepared according to Example 3 (before purification) was applied from a 4.7% solids solution of the polymer in a 90/10 by weight mixture of dioxane/methanol.

B. A 1.5 micrometer (dry thickness) layer of the polymer prepared according to Example 1H was applied from a 6% solution of the polymer in toluene.

C. A 1.5 micrometer (dry thickness) layer of the polymer prepared according to Example 4C was applied from a 6% solids solution of the polymer in a 90/10 by weight mixture of dioxane/methanol.

D. Control, no primer.

The adhesion of a thermoplastic polyurethane (Estane ® 5703 from B. F. Goodrich Chemical Company) to the primed panels was evaluated. A 10 cm×2.5 cm×0.3 cm film strip of the Estane ® was placed on the primed surface of each panel. A 35 cm×3.75 cm strip of cotton duck canvas (235 g/m² weight) was placed on top of the Estane ®. A bond was formed between the panel and the Estane ® and between the Estane and the cotton duct by pressing the composite structure at 150° C. at 8.8 kg/cm² for 15 seconds. The peel strength of the bond between the Estane ® and the steel was then determined at 180° angle using an Instron tensile tester at a peel angle of 180°. The results are given below in Table 5.

TABLE 5

| Sample | Peel Force (kg/cm width) |
|---|---|
| A | 3.8 |
| B | 3.8 |
| C | 3.8 |
| D | 1.2 |

When aluminum panels are used in place of steel panels, almost identical results are obtained. That is, substantially higher peel forces are required to remove the Estane ® from aluminum panels that have been primed with the polymers of the invention that is required to remove the Estane ® from unprimed aluminum panels.

EXAMPLE 13

This example demonstrates the ability of polymers of the invention to prime polyester film and thereby render it more adherable.

Two polyester film samples were prepared. Sample A consisted of a 50 micrometer film of biaxially oriented and heat set poly(ethylene terephthalate) film coated with a 25 micrometer wet coating of a 6% solution of the polymer prepared according to Example 1H in toluene. This sample was dried in an oven at 120° C. for 2 minutes. A 10 cm×2.5 cm×0.3 cm of Solprene ® 414 P (a styrene/butadiene block polymer of Phillips Chemical Company) was sandwiched between a 20 cm by 10 cm section of the primed polyester film and 20 cm×3.75 cm strip of duck canvas (235 g/m² weight). A bond was formed by pressing this laminate at 135° C. and 8.8 kg/cm² for 15 seconds.

Sample B was prepared exactly as described for sample A except that no primer was used on the polyester film.

The adhesion of the Solprene ® to each of the polyester films was measured by determining the 180° peel strength as described in Example 12. In Sample A, the bond between the Solprene ® and the polyester could not be broken and the polyester film underwent cohesive fracture in the 180° peel test.

In Sample B the Solprene ® could be readily removed from the polyester film. Thus, only about 0.2 kg/cm width of force was necessary to remove the Solprene ® cleanly from the polyester film.

What is claimed is:

1. A polymer having a number average molecular weight of at least 1000 and containing at least 5% by weight of recurring cyclic ether units joined one to the other to provide segments of at least two of said units, at least one of said units being a tetrahydropyran 2,6-diyl unit of the formula

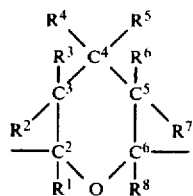

while the remainder of said cyclic ether units are selected from said tetrahydropyran 2,6-diyl units and tetrahydrofuran 2,5-diyl units, wherein said tetrahydrofuran 2,5-diyl units have the formula

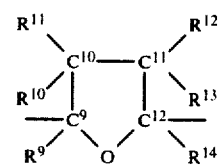

wherein
$R^1$, $R^8$, $R^9$, $R^{10}$, $R^{11}$, $R^{12}$, $R^{13}$ and $R^{14}$ are each selected from hydrogen and lower alkyl groups;
$R^2$ and $R^7$ are each selected from hydrogen, lower alkyl groups and aryl groups;
$R^4$ and $R^5$ are each selected from hydrogen, lower alkyl groups, aryl groups and halo groups, and
$R^3$ and $R^6$ are selected from hydrogen, lower alkyl groups and aryl groups, or combine to form a divalent linking moiety having the formula

wherein $C^7$ and $C^8$ are joined to the $C^3$ and $C^5$ positions respectively of said cyclic ether units; W and Z are each monovalent groups and X and Y are each monovalent groups or combine to form a divalent linking moiety Q that bridges between $C^7$ and $C^8$.

2. A polymer according to claim 1 containing at least six of said cyclic ether units joined one to the other in said segment and wherein at least 30% of the ring junctures between said cyclic ether units are in the threo configuration.

3. A polymer according to claim 2 wherein at least 50% of said ring junctures are in the threo configuration.

4. A polymer according to claim 1 wherein said cyclic ether units are said tetrahydropyran 2,6-diyl units.

5. A polymer according to claim 4 wherein each R is selected from the group consisting of hydrogen and lower alkyl groups.

6. A polymer according to claim 5 wherein each R is hydrogen.

7. A polymer according to claim 4 wherein $R^3$ and $R^6$ to combine a form a divalent linking moiety having the formula

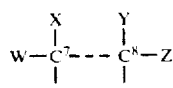

wherein W, X, Y and Z are selected from hydrogen, lower alkyl, cycloaliphatic, aryl, halo, ester, carboxyl, nitro and nitrile groups.

8. A polymer according to claim 4 wherein W, X Y, and Z are each hydrogen.

9. A polymer according to claim 4 wherein $R^3$ and $R^6$ combine to form the divalent linking moiety

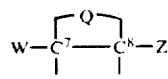

wherein W and Z are selected from hydrogen, lower alkyl, cycloaliphatic, aryl, halo, ester, carboxyl, nitro and nitrile groups and wherein Q is selected from ethylene, trimethylene, carboxylic anhydride, dimethylene oxide, imide, dimethylene sulfone and indenyl.

10. A polymer according to claim 9 wherein $R^1$, $R^2$, $R^4$, $R^5$, $R^7$, W, and Z are hydrogen and wherein Q is ethylene.

11. A polymer according to claim 4 comprising at least about 5 weight % of said tetrahydropyran 2,6-diyl units and from 0 to about 90 weight % of epoxide units of the formula

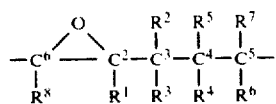

12. A polymer according to claim 11 wherein each R is hydrogen.

13. A polymer according to claim 1 consisting essentially of said cyclic ether units.

14. A polymer according to claim 13 wherein each R is hydrogen.

15. A polymer according to claim 4 wherein said segment contains at least six of said recurring tetrahydropyran 2,6-diyl units.

16. A polymer according to claim 15 wherein said tetrahydropyran 2,6-diyl units are joined one to the other so that at least 30% of the ring junctures between said units are in the threo configuration.

17. A polymer according to claim 16 wherein at least 50% of said ring junctures are in the threo configuration.

18. A polymer having a number average molecular weight of at least 1000 and containing at least 5% by weight of segments of the formula

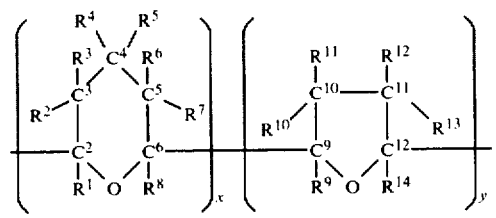

(Tetrahydropyran 2,6-diyl unit)    Tetrahydrofuran 2,5-diyl unit)

wherein $R^1$, $R^8$, $R^9$, $R^{10}$, $R^{11}$, $R^{12}$, $R^{13}$ and $R^{14}$ are each selected from hydrogen and lower alkyl groups;

$R^2$ and $R^7$ are each selected from hydrogen, lower alkyl groups and aryl groups;

$R^4$ and $R^5$ are each selected from hydrogen, lower alkyl groups, aryl groups and halo groups;

$R^3$ and $R^6$ are selected from hydrogen, lower alkyl groups and aryl groups, or combine to form a divalent linking moiety having the formula

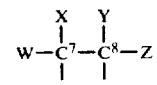

wherein $C^7$ and $C^8$ are joined to the $C^3$ and $C^5$ positions respectively of said cyclic ether units;

W and Z are each monovalent groups and X and Y are each monovalent groups or combine to form a divalent linking moiety Q that bridges between $C^7$ and $C^8$; and X and Y are each at least 1.

* * * * *